United States Patent Office 3,367,910
Patented Feb. 6, 1968

3,367,910
MODIFIED ORGANOPOLYSILOXANES AND METHOD OF PREPARATION
Charles W. Newing, Jr., Sylvania, Ohio, assignor to Owens-Illinois Inc., a corporation of Ohio
No Drawing. Filed Dec. 15, 1964, Ser. No. 418,531
16 Claims. (Cl. 260—46.5)

This invention relates broadly to compositions comprising a modified organopolysiloxane and, more particularly, to organopolysiloxanes modified with (i.e., having incorporated therein) a rare-earth chelate. The rare-earth chelate, specifically a soluble rare-earth chelate, and the amount thereof employed are effective in imparting luminsecent (including potentially luminescent) properties to the organopolysioloxane (more particularly, cured organopolysiloxane) composition. The scope of the invention also includes method features.

In one preferred embodiment of the invention the organopolysiloxane comprises or consists essentially of the siloxane condensation product of the hydrolysis product of hydrolyzable silane including at least one compound represented by the general formula (I)  $\quad\quad\quad\quad T_nSiZ_{(4-n)}$ wherein each T independently represents a member of the group consisting of alkyl, alkenyl and aryl radicals having less than 7 carbon atoms, each Z independently represents a hydrolyzable group, and $n$ represents a positive integer less than 4. Thus the integer represented by $n$ can be 1, and the hydrolyzable group represented by Z can be represented by —OR where R represented an alkyl radical having from 1 to 4 carbon atoms, inclusive. The hydrolyzable silane may then be described as trialkoxysilane consisting essentially of such silane material represented by the general formula (I-A)
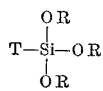

wherein T has the same meaning as given above with reference to Formula I and R has the meaning just given with reference to —OR. Examples of radicals represented by T and —OR (i.e., Z in Formula I) are given later herein.

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

In another preferred embodiment of the invention the modifier of the organopolysiloxane, which is preferably one embraced by Formula I, is a rare-earth chelate of a ketone represented by the general formula (II)  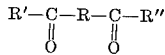

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R" has the same meaning as R' and, in addition, a hydrogen atom. The oxyhydrocarbon and thiohydrocarbon radicals referred to in the above definitions of R' and R" in Formula II are radicals wherein the carbon atoms of a hydrocarbon chain are interrupted by one or more ether (—O—) atoms or by one or more thioether (—S—) atoms.

Most present commercial luminescent devices use targets composed of polycrystalline phosphors prepared by sintering powdered inorganic reactants selected to provide the necessary host and activator components. The resulting aggregates are ground or otherwise comminuted to a particle size of about one to twenty microns, and then deposited on a substrate. Organic materials are often used as binders to obtain more uniform phosphor deposition, or as membrane coatings for the phosphor to provide a surface that can be aluminized. Several disadvantages attend these processes: comminution adversely affects luminescent efficiency of the phosphors; the phosphors' inherent sensitivity to deterioration by chemical attack is enhanced by their large surface/volume ratio when powdered; uniform contact among phosphor particles and with the substrate is difficult to achieve, and inadequate contact causes light scattering which decreases effective output. Furthermore, phosphor coatings have little abrasion resistance, and binders used in their preparation are subject to thermal deterioration; and, of course, product fabrication techniques are limited to those that do not adversely affect the sensitive phosphor screens. Also, the target is usually opaque, and consequently resolution and definition of a projected image are relatively poor.

[The terms "luminescence" (noun) and "luminescent" (adjective), as used in this specification and/or in the appended claims, are employed according to their ordinary dictionary definition; "luminescence-device" or "luminescent device" means or refers to any apparatus or contrivance by which radiation is converted to luminescent emission; and "target" means the material, regardless of its shape or form, in a luminescent device that effects this conversion.]

Much research and development effort has been expanded in recent decades on organopolysiloxanes, and compositions are known that are useful, for example, as lubricants, laminating media, protective films, flexible and rigid moldings, and for other purposes. However, to the best of my knowledge and belief, it was not known prior to this invention to provide luminescent organopolysiloxane materials in fluid, semi-solid or solid form.

The present invention is based on my discovery that luminescent (including potentially luminescent), specifically fluorescent (including potentially fluorescent) organopolysiloxanes can be prepared by modifying the organopolysiloxane with a rare-earth chelate, and specifically by incorporating therein a rare-earth chelate of a ketone embraced by Formula II.

It is well established that some rare earths have the ability to absorb radiation (at particular frequencies) and emit this radiation at other distinct frequencies. It can be demonstrated that the efficiency of this energy transfer is quite dependent upon the environment surrounding the central rare-earth atom. One method of changing this environment is to surround this central atom with oxygen-donating chelating agents such as acetyl-acetone, thenoyl-trifluoroacetone, etc. These chelating groups or structures appear to absorb this excitation radiation and transfer it to the central metal atom. The efficiency of this transfer is related to the ability of the ligand to perform this absorption and energy transfer. Due to the size and electronic structure of this rare-earth atom, it can accommodate three of these surrounding chelate groups. That is to say, it exhibits a maximum covalency of six: three primary bonds and three bonds due to coordination of the oxygen atom on the chelate to the central metal atom. It has been shown that these rare-earth central atoms can exhibit eight and possibly as much as twelve coordination.

In practicing this invention the matrix, i.e., the organopolysiloxane resin, evidently coacts with the rare-earth chelate to provide unobvious results that in no way could have been predicted. For example, when terbium thenoyl-trifluoroacetonate, $Tb(TTA)_3$, is incorporated into an organopolysiloxane in accordance with the present invention, and coatings and moldings are prepared therefrom, the cured coatings and moldings are hard, transparent and quite fluorescent (green) at room temperature (20°–30° C.). In marked contrast the organopolysiloxane employed in the test is non-fluorescent at room temperature and $Tb(TTA)_3$ itself is fluorescent only at very low temperatures of the order of −196° C. This is strongly indicative that the matrix coacts with the rare-earth chelate to provide the unobvious action. It may be that either solid solution of the chelate in the matrix occurs or that the chelate becomes bound in the resin in the form of a chemical complex that has properties (including luminescent characteristics) different from either the organopolysiloxane resinous matrix or the rare-earth chelate incorporated therein. Or, the organopolysiloxane, particularly when the preferred organopolysiloxane is employed, otherwise aids in absorbing the external radiation (e.g., U.V. light) and transfers it to the central rare-earth metal atom.

Many and various practical techniques can be employed for taking advantage of the foregoing discovery and whereby fluorescence in the visible light and/or under ultraviolet (U.V.) light and/or cathodoluminescence is imparted to the target comprising an organopolysiloxane resin modified with a rare-earth chelate. For example, the solid, machinable, thermosetting organopolysiloxane resins or structures disclosed and claimed in copending application Ser. No. 306,344 of Alfred J. Burzynski and Robert E. Martin, now abandoned, and assigned to the same assignee as the present invention, may be modified by combining therewith (e.g., by incorporating therein) a rare-earth chelate, more particularly a rare-earth chelate of a ketone of the kind embraced by Formula II. By such modification the invention provides means for producing clear (if desired) and relatively thick, machinable bodies or structures of pre-selected dimensions having the aforementioned luminescent properties and which also are free from interior deformations or voids. Such a unique combination of properties was heretofore unknown in the organopolysiloxane art.

The luminescent, modified, organopolysiloxane materials or compositions of this invention can be produced in fluid, specifically liquid, in semi-solid or, as stated in the preceding paragraph, in solid form. They are useful in such commercial applications as, for instance, fluorescent lights, radiation-detection devices and radar screens; as luminous markers, signs, dials such as those on automotive and airplane panel boards, and the like; and in many other applications that will be immediately apparent to those skilled in the art from the foregoing illustrative examples. Luminescent devices wherein are utilized the compositions of this invention are more fully disclosed and are broadly and specifically claimed in the copending application of Frank T. King, Ser. No. 418,458, filed concurrently herewith and assigned to the same assignee as the present invention.

It is accordingly a primary object of the present invention to provide new and useful luminescent, specifically fluorescent, modified organo-silicon compounds and, more particularly, modified organopolysiloxanes.

Another object of the invention is to provide a luminescent, machinable, heat-resistant, modified organopolysiloxane body or structure.

Another object of the invention is to provide a method of preparing the luminescent, modified organopolysiloxanes constituting a feature of this invention.

Still other objects of the invention will be apparent to those skilled in the art from the following more detailed description and the appended claims.

The objects of the invention are attained by producing an organopolysiloxane, which is a condensation product of a silanol or mixture of silanols (including those briefly described hereinbefore and more fully hereafter), and which has been modified with a luminescent-imparting (including potentially luminescent-imparting) rare-earth chelate. An organopolysiloxane is often designated by those working in the art as "organopolysiloxane resin" (even though it may be a siloxane condensation product in liquid form), and this nomenclature is sometimes used herein.

The luminescent compositions of the instant invention overcome many of the disadvantages of the prior-art compositions or substances and which were briefly described and their disadvantages set forth in the fifth paragraph of this specification. This is because there is utilized a composition comprising or consisting essentially of a luminescent, modified organopolysiloxane resin. Such resins not only can be made in liquid, semi-solid or solid form as indicated hereinbefore, but they also can be produced in different opacities (transparent, translucent or opaque) to meet the requirements of a particular service application. As liquid, luminescent compositions they can be adapted to any convenient shape, or they can be used in a flowing system. Also, they can be cast into a variety of shapes from thin films to bulk moldings, e.g., molding that are several inches thick. The concentration of the rare-earth chelate can be readily varied over a wide range, as desired or as conditions may require, which fact will be evident from certain parts of the following more detailed description.

In accordance with one embodiment of the present invention there is first prepared an organopolysiloxane comprising or consisting essentially of the siloxane condensation product of hydrolyzable silane including at least one compound embraced by Formula I.

Illustrative examples of groups represented by Z in Formula I include, for example, halogen (chlorine, bromine, fluorine and iodine), alkoxy (e.g., methoxy through heptoxy), and acyloxy (e.g., acetoxy, propionoxy, butyroxy, pentanoxy, hexanoxy, etc.), and aryloxy, e.g., phenoxy. In particular, alkoxy groups are preferred because their hydrolysis products are less acidic, and therefore control of the rate of siloxane condensation is simpler. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

Illustrative examples of radicals represented by T in Formula I are alkyl, e.g., methyl, ethyl and propyl through hexyl (both normal and isomeric forms), cyclopentyl, cyclohexyl, vinyl and the normal and isomeric forms of propenyl through hexenyl, and phenyl.

More specific examples of compounds embraced by Formula I are given hereinafter with respect to compounds within the scope of Formulas III and IV given later herein.

Monomeric starting materials of the formula $$T_nSiZ_{(4-n)}$$

can be prepared by a variety of procedures known to the art. For example, a convenient route involves conversion of a halide, TX, to the corresponding lithium derivative, TLi, or Grignard reagent, TMgX, followed by condensation of the organometallic reagent with a silicon tetrahalide or an alkyl orthosilicate in a suitable molar ratio. Conversion of one hydrolyzable function on silicon to another can also be readily effected. Ethanolysis and acetolysis of silicon halides are examples of such conversions.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of an added solvent, are used. Viscosity of the final product can be regulated by controlling the time of reaction, use of catalysts, concentration of reactants, rate of evaporation, and similar variables. The particular manner in which control of these variables will be attained will depend on the particular circumstances, and can be determined by routine experimentation according to procedures generally well known to those skilled in the art.

*Preparation of unmodified organopolysiloxanes*

In general, the preparation of the unmodified organopolysiloxane comprises heating a hydrolyzable silane including at least one compound embraced by Formula I with from 1.5 to 10 moles of water for each mole of the total molar amount of the hydrolyzable silane(s). Heating is continued for at least one hour and up to about 10 hours or more at a temperature of at least about 50° C. while retaining at least about 1.5 moles of hydroxy-containing by-product in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization alkanol and/or phenolic by-products and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the organopolysiloxanes would probably allow use of, for example, alkoxysilanes containing a higher number of carbon atoms in an alkoxy chain. However, in general, the longer hydrolysis time required by alkoxy radicals of longer chain-length makes them, ordinarily, undesirable for use.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silane reactant(s). Organopolysiloxane resins can be prepared at the aforementioned lower concentration of water, but further decrease in the water content of the reaction mass ordinarily leads to the production of polymers that are rubbery and soft, presumably due to incomplete hydrolysis and condensation. If the quantity of water is in the range of from about 1.5 moles to about 5 moles of water per mole of the hydrolyzable silane(s), the hydroxy-containing by-products, e.g., alkanols or phenol, formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

If the ratio of water to hydrolyzable silane(s) substantially exceeds 5:1, the resulting amount of by-product hydrolysis products, such as alkanols or phenol, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzable silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

It is preferred that some of the hydrolysis by-products, such as alkanols or phenols, be retained in the reaction mass during the initial hydrolysis and condensation. It is believed that the presence of such hydroxy-containing by-products slows, by mass action, the overall rate of hydrolysis-condensation. This control of the rate of resin formation prevents gel formation and makes possible the preparation of homogeneous, rare earth chelate-modified, highly cross-linked polymers having good dimensional stability. If the concentration of hydrolysis by-products is allowed to fall substantially below 1.5 moles thereof per mole of the hydrolyzable silicon- containing monomeric material (assuming that complete hydrolysis takes place), gel formation occurs. This limit can vary slightly with the particular materials and conditions employed.

After initial hydrolysis and condensation under the conditions just described, controlled volatilization of the hydrolysis by-products, e.g., alkanols and phenol, and water is effected while the reaction mass is heated to from about 100° C. to about 300° C. This relatively high (i.e., above 100° C.) temperature step is herein designated as the "precure" step.

The purpose of precure is to effect controlled removal of volatiles while the siloxane condensation reaction continues at a convenient rate, but which is nevertheless slowly enough to avoid gel formation. In general, the highest possible precure temperature is preferred, since this provides greatest impetus to siloxane formation and volatilization of the hydrolysis by-products, and makes possible the shortest time required to effect final cure at a lower temperature.

The temperature to which a particular reaction mass can be heated during precure without causing gelation thereof depends, for example, upon the particular materials used and their prior treatment, but the limit can be readily established by heating an aliquot to gelation and keeping the precure temperature of the main batch slightly below this gelation point. The precure time is similarly dependent upon several variables. At a precure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereinafter set forth in detail. Commercial hydrolyzable silicon-containing compounds (silanes) of the kind embraced by Formula I, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidating species. Reduction of acid content can be carried out by adding bases such as metal hydroxides or amines, but the salts that are formed are objectionable impurities in the final products.

A preferred technique for preparing the monomeric material is by distillation of an admixture of the monomer with a reagent that will convert acidic species therein to non-volatile compounds, for instance as disclosed in the copending application of Burzynski and Martin, Ser. No. 370,684, which is assigned to the same assignee as the present invention.

Initial hydrolysis-condensation is conveniently carried out by charging to a reaction vessel pure water and a hydrolyzable silane of the kind embraced by Formula I. The initially cloudy reaction mixture clears on heating, usually within an hour, because the hydroxyhydrocarbon by-product, specifically alcohol, dissolves the other components of the mixture. A suitable degree of hydrolysis-condensation is usually obtained if reflux is allowed to proceed for from about 1 to 4 hours after the mixture clears. This step can be carried out at lower temperatures, but the rate is substantially slower.

The upper limit of permissible acid content during this initial hydrolysis-condensation is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where $Z$ is the average number of hydrolyzable groups attached to silicon throughout the reaction mass. Thus when the hydrolyzable silane is, for example, a methyltrialkoxysilane as the sole silane constituent, the theoretical lower molar ratio of hydrolyzable silane:water is 1:1.5. At this molar ratio, the acid content is generally controlled within the range of from about 50 to about 650 parts (or higher in some cases) of HCl per million parts of hydrolyzabl silane. When the hydrolyzable silane:water molar ratio is 1:3.0, the minimum acid content is about zero part of HCl per million parts of the hydrolyzable silane and the maximum is about 5 parts on this same basis.

The aforementioned limits are necessarily subject to minor variation in each case. First, polymer formation by its nature will not proceed identically in any two runs, and the particular mode of polymerization can alter slightly the acid sensitivity of the system. Second, use of other hydrolyzable silanes in certain amounts as comonomers can reduce acid senstivity, but the effect will generally be small. Third, extremely small quantities of impurities in a given sample, impractical to remove, can alter acid sensitivity slightly. These factors, however, affect only the maximal and minimal extremes of acid content, and the major portion of the suitable area indicated will be unchanged.

It is usually most convenient to reduce the acid content of the monomer(s) to about zero part by weight of HCl per million parts of monomer(s) by suitable acid-removal technique and, if necessary, then adjust the acidity of the initial reaction mixture by adding acid to the water used. Although generally any acidic material soluble in the reaction mass can be used, organic acids such as phenol and formic acid are particularly suitable because they retard subsequent oxidation of the reactants.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this precure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the precure step is omitted from the process, the resins cast from the liquid, rare earth chelate-modified organopolysiloxane crack severely during the final curing step. Such cracked resins can be pulverized, e.g., to 300-mesh particle size and finer, and the finely divided luminescent resin used as a filler in paints and molding compositions (e.g., urea- and melamine-formaldehyde resins, methyl methacrylate and other acrylate polymers, polystyrene, etc.), and in making other filled compositions and articles from any of the available unfilled or partly filled natural resins, thermoplastic and thermosetting resins and plastics, and the like.

*Production of solid, luminescent, machinable, thermosetting resins or structures*

As has been indicated hereinbefore, the present invention can be practiced by modifying the solid, machinable, thermosetting organopolysiloxane resins or structures disclosed and claimed in the aforementioned Burzynski and Martin copending application Ser. No. 306,344, now abandoned. The disclosure of this application and of the aforementioned Burzynski and Martin copending application Ser. No. 370,684, are by this cross-reference made a part of the disclosure of the instant invention, both of which are assigned to the same assignee as the present invention.

The invention of Burzynski et al. application Ser. No. 370,684 is directed to a method of preparing a solid resin by (a) heating reactant(s) consisting of a methyltrialkoxysilane of the formula (III) 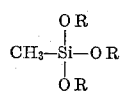

and 0 to 10 mole percent, preferably not more than 5 percent, based on total silane reactant(s), of at least one compound of the formula (IV) 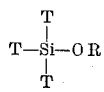

wherein each T independently represents a monovalent radical selected from the group consisting of aryl, alkyl (including cycloalkyl), and alkenyl radicals, each of which contains less than 7 carbon atoms, and the alkoxy radical, RO—, wherein R represents an alkyl radical of less than 4 carbon atoms, and from 1.5 to 10 moles of water per mole of silane, for at least one hour and up to 10 hours at temperatures of at least 50° C. while retaining at least 1.5 mole of alkanol by-products in said mixture per mole of silane starting material assuming complete hydrolysis of all alkoxy-silicon linkages in said mixture, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Methyltrialkoxysilanes used in practicing the invention of the aforementioned Ser. No. 370,684 are those of the formula CH₃Si(OR)₃ where each R represents an alkyl radical with less than 4 (i.e., 1 to 3) carbon atoms. Included are methyltrimethoxysilane, methyltriethoxysilane, methyltri-n-propoxysilane, and methyltriisopropoxysilane, as well as compounds with mixed alkoxy groups. Examples of co-reactants embraced by Formula IV (and also by Formula I, supra) include trimethylmethoxysilane, tri(1-methylethyl)ethoxysilane, di(1-methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)-trimethoxysilane, (1,1-dimethylethyl)tripropoxysilane, hexyltriethoxysilane, and vinyltriethoxysilane.

Comonomers embraced by Formula I and also by Formula IV, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent, preferably not more than 5 mole percent, based on the total hydrolyzable silanes, of a compound of the kind embraced by Formula IV. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl)polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

*Other technique for preparing an organopolysiloxane which is modified with a rare-earth chelate*

Other technique, including both composition and method features, for preparing an organopolysiloxane that advantageously can be modified with a rare-earth chelate in accordance with the present invention is described in the aforementioned Burzynski and Martin copending application Ser. No. 306,344, now abandoned. In this Burzynski et al. application (hereafter often designated as the -344 application), a mixture which comprises a precursor hydrolyzable to methylsilanetriol, a precursor hydrolyzable to phenylsilanetriol, and water is heated; the reaction mixture is concentrated by removing a substantial portion but not all of the volatile components; heated above the boiling point of pure water at the prevailing pressure; and formed and heated at a temperature below the boiling point of pure water at the prevailing pressure to provide a machinable, thermosetting, heat-resistant organopolysiloxane body.

In the procedure of the invention of the -344 application usually a mixture which comprises a hydrolyzable methyltrialkoxysilane, a hydrolyzable phenyltrialkoxysilane, and water in a relative molar ratio of x:y: at least 1.5 (x+y), respectively, wherein x and y are independently selected from the range of 1 to 10, inclusive, is heated at a temperature between ambient temperature and reflux temperature for a time of 1 to 10 hours; 50 to 90 mole percent of the alkanol by-product is removed by volatilization; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 60 centigrade degrees below the boiling point of pure water at the prevailing pressure to give a machinable, thermosetting, heat-resistant organopolysiloxane body.

The methyltrialkoxysilanes and phenyltrialkoxysilanes cited in the preceding paragraph refer to compounds of the formula $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy) silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2 - propoxy)silane, phenyltri(2 - methyl-2-propoxy) silane, phenyltri(1-butoxy)silane, and phenyltri(2-butoxy)silane.

A further aspect of the invention of the –344 application that provides an especially heat-resistant, machinable, thermosetting organopolysiloxane body comprises heating a mixture which comprises a hydrolyzable methyltrialkoxysilane, a hydrolyzable phenyltrialkoxysilane, and water in a relative molar ratio of $x:y$: at least 1.5 $(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1- to 10 hours; removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degres below the boiling point of pure water at the prevailing pressure, then at a temperature increasing continually up to a maximum of 350° C. over a period of from 2 to 30 days, and finally allowing the sample to return slowly to ambient temperature over a time of from 1 to 12 hours.

A preferred procedure of the invention of the –344 application comprises heating at reflux temperature, for from 2 to 4 hours, a reaction mixture which comprises methyltriethoxysilane, phenyltriethoxysilane, and water in a relative molar ratio of $x:y$: at least 1.5 $(x+y)$, respectively, and advantageously a ratio of $x:y:3(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect precure at a temperature within the range of from 5 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of 350° C. over a period of from 2 to 30 days, and finally allowing the sample to return slowly to ambient temperature over a time of from 1 to 12 hours.

A preferred procedure of the invention of the –344 application comprises heating at reflux temperature, for from 2 to 4 hours, a reaction mixture which comprises methyltriethoxysilane, phenyltriethoxysilane, and water in a relative molar ratio of $x:y$: at least 1.5 $(x+y)$, respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressure; and finally casting and then curing the resulting resinous mixture at 25° to 95° C. and at about atmospheric pressure for a time of from one day to one week to give a machinable, thermosetting, heat-resistant organopolysiloxane body.

The initial reaction mixture of the procedure of the –344 application optionally contains an acidic or basic catalyst, although the hydrolysis and subsequent condensation normally proceed at a convenient rate without them. To avoid premature gelation of the resins the quantity of acid or base in the reaction mixture must be below 0.01 mole of acid or base per mole of hydrolyzable silanol precursor. Similarly a solvent, e.g., ethanol, can be added to render the reaction mixture homogeneous.

The initial reaction mixture used in the invention of the –344 application also may contain precursors of methylsilanetriol and phenylsilanetriol in the above-defined ratios and 0 to 10 mole percent, usually 0 to 5 mole percent, of a co-reactant which, when present, usually comprises at least 1 mole percent of the mixture. (The aforementioned mole percentages are based on the hydrolyzable silane components of the initial mixture.) The aforesaid co-reactant comprises at least one compound of the formula (V)) 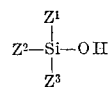

wherein $Z^1$, $Z^2$ and $Z^3$ represent monovalent hydrocarbon radicals independently selected from the group consisting of aryl, alkyl (including cycloalkyl) and alkenyl radicals, each of which contains less than 7 (i.e., 1–6) carbon atoms, and the hydroxyl radical. Examples of such co-reactants are trimethylsilanol, tri(1-methylethyl) silanol, trihexylsilanol, di(1-methylpropyl)silanediol, divinylsilanediol, diphenylsilanediol, propylpentylsilanediol, methylallylsilanediol, vinylphenylsilanediol, ethylsilanetriol, 1 - methylethylsilanetriol, 1,1 - dimethylethylsilanetriol, 2,2-dimethylpropylsilanetriol, hexylsilanetriol, and vinylsilanetriol. These co-reactants can be added to the reaction mixture in the form of their precursors of the formula (VI) 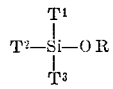

wherein $T^1$, $T^2$ and $T^3$ represent monovalnt hydrocarbon radicals independently selected from the group consisting of aryl, alkyl (including cycloalkyl) and alkenyl radicals, each of which contains less than 7 carbon atoms, and the alkoxy radical RO—, wherein R has the meaning previously defined. Examples of such precursors are trimethylmethoxysilane, tri(1-methylethyl)ethoxysilane, trihexyl(1,1 - dimethylethoxy)silane, tricyclopentylmethoxysilane, di(1-methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)trimethoxysilane, (1,1 - dimethylethyl)tripropoxysilane, (2,2-dimethylpropyl)tributoxysilane, hexyltriethoxysilane, and vinyltriethoxysilane.

A further variation in the procedure of the invention of the –344 application can be achieved by hydrolyzing individually a hydrolyzable methyltrialkoxysilane and a hydrolyzable phenyltrialkoxysilane, and then combining the resulting organopolysiloxanes to form the initial reaction mixture described above. The resulting resinous mixture ultimately yields, by the method described, a machinable, thermosetting, heat-resistant organopolysiloxane body.

Products of the invention of the –344 application and luminescent, specifically fluorescent, modifications of which can be produced by the instant invention are machinable, heat-resistant bodies comprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementiond silanols employed therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

*The rare-earth chelate modifier*

The rare-earth chelates (i.e., chelates of a rare-earth metal) used in modifying an organopolysiloxane in accordance with the present invention are compounds composed of a chelating (chelate-forming) structure which contains at least two donor groups so located with respect to one another that they are capable of forming a chelate ring (normally of five or six members) with a rare-earth metal. The donor groups are well known and recognized by those skilled in the art of chelate chemistry. See (for example, the following literature references concerning chelate chemistry and lists of principal donor groups: "The Chelate Rings," by H. Diehl, "Chemical Reviews" 21, 39–111 (1937); and "Chemistry of the Metal Chelate Compounds," by Martell and Calvin, published in 1952 by Prentice-Hall, Inc., New York, N. Y. (1952). It might here also be mentioned that, in chelate-chemistry language, organic compounds containing the aforementioned chelating structures are often designated as "ligands"; and organic compounds having at least two ligand functions (i.e., at least two chelating structures) are often termed "polyligands." The aforementioned donor groups, and hence the chelate-forming structures or ligands therefrom, contain many different donor atoms among which may be mentioned by way of example oxygen, sulfur and nitrogen atoms. Optimum results in practicing the present invention have been obtained when the donor atom is an oxygen or a sulfur atom.

The rare-earth chelate used in carrying the instant invention into effect is preferably, but not necessarily, a chelate of a rare-earth metal and a "volatile chelating agent"; and by which latter term is meant more particularly an organic compound that can be vaporized (volatilized) with little or no decomposition. For example, such volatile chelating agents advantageously are those boiling below about 300° C. at 760 mm. pressure, although the use of chelating agents boiling above this temperature is not precluded.

As indicated in the fourth paragraph of this specification, the preferred chelating agent is a ketone embraced by Formula II, this is, one represented by the general formula

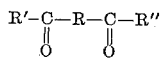

where R, R' and R'' have the meanings given in said paragraph.

Illustrative examples of divalent radicals having from 1 to 3 carbon atoms, inclusive, that are represented by R in Formula II are divalent aliphatic hydrocarbon radicals having from 1 through 3 carbon atoms, e.g., alkylenes such as methylene, ethylene, propylene and isopropylene; and alkenylenes such as ethenylene, propenylene and isopropenylene.

Illustrative examples of radicals represented by R' and R'' in Formula II are the monovalent hydrocarbon, halo-hydrocarbon, oxyhydrocarbon and thiohydrocarbon radicals containing from 1 to 12 carbon atoms, inclusive. More specific examples of such radicals are aliphatic (including cycloaliphatic), aromatic-substituted aliphatic, aromatic, and aliphatic-substituted aromatic hydrocarbon radicals having from 1 through 12 carbon atoms such as alkyl, e.g., methyl, ethyl and propyl through dodecyl (both normal and isomeric forms), cyclopentyl, cyclohexyl, cycloheptyl, etc.; alkenyl, e.g., vinyl, ethenyl, propenyl and other alkenyl radicals corresponding to the aforementioned alkyl radicals; aralkyl, e.g., benzyl, phenylethyl, phenylpropyl, etc.; aryl, e.g., phenyl, biphenylyl, naphthyl, etc.; alkaryl, e.g., tolyl, xylyl, diethylphenyl, dipropylphenyl, butylphenyl, etc.; the corresponding chlorinated, brominated and fluorinated derivatives (mono- through perhalogenated in the linear chain and/or in the aromatic nucleus); and the corresponding oxy and thio derivatives wherein one or more oxygen and/or sulfur atoms are positioned between carbon atoms in a linear chain and/or an aromatic ring. For instance, R' and/or R'' in Formula II may be alkoxyalkyl (e.g., methoxymethyl, -ethyl, -propyl, -butyl, -pentyl and -hexyl) or the corresponding thio derivatives; the methoxy-through pentoxyphenyls or the corresponding thio derivatives; or heterocyclic compounds containing one or more oxygen or sulfur atoms in the ring, e.g., thienyl, furyl and the like.

When the chelating agent employed is a ketone embraced by Formula II, in certain cases one may use advantageously ketones boiling below about 300° C. at 760 mm. pressure.

The chelating agents employed in the preparation of the rare-earth acylacetonates and other rare-earth chelates are those which are most readily available at minimum cost. Examples of classes of such chelating agents are the 1,3-diketones of which the diketones embraced by Formula II are a preferred sub-class, the β-ketoesters and the aromatic o-hydroxyaldehydes and esters. More specific examples of such chelating agents including those embraced by Formula II as well as of others outside the scope of this formula are acetylacetone, propionylacetone, butyrylacetone, valerylacetone, caproylacetone, caprylylacetone, benzoylacetone(1-phenyl-1,3-butanedione), 3-methyl-2,4-pentanedione, 3-ethyl-2,4-pentanedione, trifluoroacetylacetone, 2-thenoylacetone, 2-thenoyltrifluoroacetone, 2-furoylacetone, 2-furoyltrifluoroacetone, ethyl through heptyl acetoacetates, salicylaldehyde, methyl salicylate, ethyl salicylate, and others that will be apparent to those skilled in the art from the foregoing illustrative examples.

The metal that is chelated with such chelating agents, and which preferably contains no nitrogen donor atom(s), may be any of the rare-earth metals. The chelate of yttrium also may be used in modifying an organopolysiloxane to produce compositions of this invention. Although yttrium is not classified among the rare-earth elements in Mendeleev's Table of the Periodic Arrangement of the Elements, it functions in the same way as do those rare-earth elements listed in said table. Hence those skilled in the art presently consider yttrium among the rare-earth elements, and this is the classification given it in this specification.

*Preparation of rare-earth chelates*

Various methods for the preparation of most of the rare-earth chelates are described in the prior art. See, for example, the following literature citations: "Intramolecular Energy Transfer in Rare Earth Chelates. Role of the Triplet State," by Crosby et al., "The Journal of Chemical Physics," 34, 3, 743 (March 1961); "Spectroscopic Studies of Rare Earth Chelates," by Crosby et al., "Journal of Physical Chemistry," 66, 2493 (December 1962); "Fluorescence and Lifetimes of Eu Chelates," by Samelson et al., "The Journal of Chemical Physics," 39, 1, 110 (July 1, 1963); and "Fluorescence of Europium Thenoyltrifluoroacetonate. I. Evaluation of Laser Threshold Parameters," by Winston et al., "The Journal of Chemical Physics," 39, 2, 267 (July 15, 1963).

The technique used by the applicant in preparing rare-earth chelates is exemplified by that described under the hereaftermentioned Examples 1 through 8, 13–A and 14–A. Stoichiometrical amounts of a solution of a water-soluble salt of the rare-earth, e.g., the chloride or nitrate salt, are brought into reactive relationship with a solution of a chelating agent, such as a 1,3-diketone, in the presence of an equivalent amount of a base. Surprisingly the applicant found that in such a reaction quinoline and, less so, pyridine are markedly superior to other bases heretofore employed in making the rare-earth chelates that are used in modifying organopolysiloxanes in accordance with this invention. In addition to the solvents employed in the specific examples, one may use other solvents such as those set forth in the prior art, e.g., in the aforementioned literature citations. In preparing the chelate, one usually may advantageously employ a solvent solution of the chelating agent in an amount which is up to, for example, 10% in excess of stoichiometrical proportions.

Incorporation of rare-earth chelate into an organopolysiloxane

Any suitable technique may be used in incorporating the rare-earth chelate into the organopolysiloxane. In some instances it may be advantageous to admix the chelate with the silanol(s) and/or precursor(s) of silanol(s) prior to hydrolysis (if a precursor or precursors are employed) and condensation to an organopolysiloxane.

The chelate may be admixed with liquid, semi-solid or solid organopolysiloxanes at any stage of their preparation or after the organopolysiloxane has been formed, the exact point of admixture depending upon such influencing factors as, for example, the ultimate physical state or form of the organopolysiloxane and the use to which the chelate-modified organopolysiloxane is to be placed. For instance, if the organopolysiloxane is normally a liquid, the chelate may be incorporated into the crude (i.e., impure) organopolysiloxane if the latter is to be modified and employed without further purification prior to use; or the chelate may be admixed with the purified organopolysiloxane fraction of the desired B.P. or boiling range. In the case of semi-solid organopolysiloxanes such as those in the form of greases, the chelate may be admixed with the organopolysiloxane during or after its conversion to a semi-solid (e.g., grease or grease-like consistency). If the ultimate organopolysiloxane is normally a solid obtained by curing (e.g., heat-curing) a curable (e.g., heat-curable) organopolysiloxane and the end-product is to be used in comminuted or finely divided state (e.g., a fineness of from 100- to 300-mesh or more, U.S. Standard Sieve Series), then the chelate may be mixed in a suitable blender with the finely divided organopolysiloxane until a homogeneous (substantially homogeneous) mixture is obtained. Such finely divided chelate-modified organopolysiloxanes may be incorporated into a wide variety of compositions such as paints, varnishes, floor polishes and other types of decorative- and protective-coating compositions, especially when luminescent (e.g., fluorescent) properties are desired in the applied coating. In some cases, such finely divided, chelate-modified organopolysiloxanes are useful in applications wherein inorganic phosphors are presently used.

The preferred method of incorporating the rare-earth chelate into an organopolysiloxane, more particularly a curable (e.g., heat-curable) organopolysiloxane, comprises partly curing a curable organopolysiloxane; forming a homogeneous admixture of (a) the partly cured organopolysiloxane in liquid state and (b) a solvent solution of a rare-earth chelate (numerous examples of which have been given hereinbefore); and completing the cure of the partly cured organopolysiloxane in the presence of the said chelate. The preferred organopolysiloxane comprises or consists essentially of the siloxane condensation product of hydrolyzable silane including at least one compound represented by Formula I. The reference above to the "liquid state" of such organopolysiloxanes means that they may be liquid in the absence of a solvent or that they may be dissolved or dispersed in a solvent to form a liquid composition.

The preferred modifier of the organopolysiloxane is a rare-earth chelate of a ketone represented by Formula II.

A more specific embodiment of the method features of the present invention is directed to a method of producing a luminescent composition which comprises:

(A) hydrolyzing a hydrolyzable silane including at least one compound represented by the general formula $$T_nSiZ_{(4-n)}$$

wherein each T independently represents a member of the group consisting of alkyl, alkenyl and aryl radicals having less than 7 carbon atoms, each Z independently represents a hydrolyzable group, and $n$ represents a positive integer less than 4;

(B) condensing the hydrolysis product to yield a heat-curable organopolysiloxane;

(C) partly curing the heat-curable organopolysiloxane;

(D) adding to the partly cured organopolysiloxane in liquid state a solvent solution of a rare-earth chelate of a ketone embraced by Formula II, the said rare-earth chelate and the amount thereof being effective in imparting luminescence to the cured organopolysiloxane composition;

(E) mixing the resulting liquid mass to form a homogeneous admixture; and (F) completing the cure of the partly cured organopolysiloxane in the presence of the said rare-earth chelate.

The amount of rare-earth chelate which is incorporated into the organopolysiloxane may be widely varied as desired or as conditions may require. For instance, depending upon such influencing factors as, for example, the chosen rare-earth chelate and the intended use of the chelate-modified organopolysiloxane, it may be as little as, for example, a trace amount of chelate (that is, an amount ranging from, for instance, 1 to 200 parts of chelate, calculated as rare-earth metal, per million parts of organopolysiloxane) up to a molar ratio of chelate to organopolysiloxane of 1 to about 20, respectively, more particularly from 1 to about 50, respectively, and still more particularly from 1 to about 100, respectively, calculated as rare-earth metal (M) to Si. Usually the molar ratio of M:Si ranges between 1:100 and 1:2000, respectively, e.g., 1:1000±500, respectively. No particular advantages seemingly accrue from using more rare-earth chelate than is necessary to impart the desired properties, particularly luminescence and specifically U. V. fluorescence, to the organopolysiloxane.

The preferred organopolysiloxanes employed in practicing this invention are those prepared as previously has been described and into which the rare-earth chelate has been incorporated by the above-described preferred technique. Further processing of the chelate-modified, partly cured (i.e., precured) organopolysiloxane is essentially the same as set forth in the aforementioned Burzynski and Martin copending applications Ser. Nos. 306,344 and 370,684. For instance, modifiers in addition to a rare-earth chelate, and which are substantially chemically inert during the further curing conditions employed, can be added to the organopolysiloxane to obtain desired variations in properties. Fillers, e.g., diatomaceous earth and other forms of silica, as well as clays or clay-like materials, e.g., diatomaceous earth, bentonite, etc., fibers, e.g., glass fibers, organic fibers of natural and synthetic origin, etc., can be added. Coloring agents such as alcohol- or water-soluble dyes or insoluble pigments can be incorporated into the chelate-modified organopolysiloxane to give luminescent compositions or bodies of the kind herein described and which are also colored. The quantity of dye or pigment and the most advantageous point of its addition depend upon such influencing variables as, for instance, the particular coloring agent used and the desired color of the product. These variables are, therefore, best determined by routine test.

Illustrative examples of other effect agents that may be incorporated into the organopolysiloxane are opacifiers, e.g., titanium dioxide, zinc oxide, etc., plasticizers, mold lubricants, heat-stabilizers, inhibitors of various kinds including decomposition inhibitors, natural and synthetic resins, and other modifiers or additives commonly employed in casting, molding, coating and other compositions.

After casting or otherwise shaping in a mold, or after deposition as a coating on a substrate, or other similar or equivalent action, the chelate-modified organopolysiloxane resin is cured. Cross-linking and some linear polymerization probably proceed at this stage since the resin becomes increasingly hard.

Taking as an example the production of a cast resin to obtain a hard, machinable, luminescent, heat-resistant body, the final cure of such a resin can be carried out, if desired, at room temperature (20°–30° C.) or lower merely by allowing the cast resin to remain undisturbed.

Although the final cure may be effected without added heat, a more convenient procedure involves heating the chelate-modified, precured, organopolysiloxane resin at about 90° C. for varying time intervals, e.g., for from about 1 to 3 days, or sometimes longer, for instance up to 7 days. The final stages of cure can also be carried out at temperatures above 100° C. after a cure at 90° C. has brought the resin to a substantially hard condition.

Additional details of precuring and curing conditions are given in some of the examples which follow.

The luminescent, specifically fluorescent, resinous product of the precure step is soluble in water-miscible organic solvents such as alkanols (e.g., methanol through pentanol), ketones (e.g., acetone, methyl ethyl ketone, etc.), ethers (e.g., glycol monethyl ether, tetrahydrofuran, etc.), as well as many other common organic solvents. The resulting solutions, which can be used as liquid targets in a luminescent device, have prolonged storage life before gelation occurs, and their stability increases with decreasing temperature and resin concentration.

A lower limit for resin concentration is set only by convenience, since storage and subsequent removal of solvent from extremely dilute solutions is generally commercially unfavorable. These dilute solutions, usually containing about 50 weight percent of resin solids, can be evaporated to a more viscous stage and used as molding materials by the further curing steps already described. As previously indicated, they can also be used as fluorescent (including potentially fluorescent) film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., according to the curing process previously described for making a molded resin. These films are useful, for example, as water- and abrasion-resistant coatings.

The chelate-modified organopolysiloxanes of this invention also may be useful in phototropic and laser applications.

The above-described techniques for the preparation of solid, luminescent, organopolysiloxane bodies are, in general, also applicable to the formation of such films. The final, cured products are substantially solid and apparently possess a high degree of cross-linking, since they are substantially insoluble in solvents such as benzene and toluene.

In order that those skilled in the art may better understand how the present invention can be carried into effect, the following examples are given by way of illustration and not by way of limitation. All parts and percentages are by weight unless otherwise stated.

EXAMPLE 1

*Preparation of europium thenoyltrifluoroacetonate*

| Materials Used | Weight Used, g. | Mole Used | Molar Ratio | Solvent |
| --- | --- | --- | --- | --- |
| 4,4,4-trifluoro-1-(2-thienyl)1,3-butane-dione (TFTBD). | 2.54 | 0.0114 | 3 | 50 ml. toluene. |
| Eu(NO$_3$)$_6$H$_2$O | 1.70 | 0.0038 | 1 | 50 ml. water. |
| Quinoline | 1.47 | 0.0114 | 3 | |

The europium nitrate is dissolved in water, and to the resulting solution is added a toluene solution of the butane-dione. The mixture is stirred violently. Quinoline is next added and the resulting mixture is stirred. A water layer separates and is removed. Hexane (70 ml.) is added, and upon standing at room temperature an off white-colored product comprising europium thenoyltrifluoroacetonate [Eu(TTA)$_3$] crystallizes from solution. It is isolated by filtration and dried under vacuum.

Under U.V. light this europium chelate fluoresces a bright orange red.

EXAMPLE 2

*Preparation of terbium thenoyltrifluoroacetonate*

Exactly the same procedure is followed as described under Example 1 with the exception that 0.0038 mole of terbium nitrate, Tb(NO$_3$)$_3$·6H$_2$O, is used instead of 0.0038 mole of europium nitrate. The product comprising terbium thenoyltrifluoroacetonate, Tb(TTA)$_3$, does not fluoresce under U.V. light at room temperature, but at the temperature of liquid nitrogen (i.e., about −196° C.) it emits a brilliant green.

EXAMPLE 3

*Preparation of lanthanum thenoyltrifluoroacetonate*

| Materials Used | Weight Used, g. | Mole Used | Molar Ratio | Solvent |
| --- | --- | --- | --- | --- |
| TFTBD | 2.54 | 0.015 | 3 | 50 ml. toluene. |
| Lanthanum trichloride.7H$_2$O. | 1.50 | 0.005 | 1 | 70 ml. water. |
| Quinoline | 1.70 | 0.015 | 3 | |

The procedure is essentially the same as that described under Example 1. The product comprising lanthanum thenoyltrifluoroacetonate, La(TTA)$_3$, has no obvious fluorescence when exposed to U.V. light.

EXAMPLE 4

*Preparation of praseodymium thenoyltrifluoroacetonate*

Same as in Example 3, which refers back to Example 1 for details of procedure, with the exception that 0.005 mole of praseodymium nitrate, Pr(NO$_3$)$_3$·6H$_2$O, is used instead of 0.005 mole of LaCl$_3$·7H$_2$O. The product comprising praseodymium thenoyltrifluoroacetonate, Pr(TTA)$_3$, gives no visual indication of fluorescence upon exposure to U.V. light.

EXAMPLE 5

*Preparation of dysprosium thenoyltrifluoroacetonate*

| Materials Used | Weight Used, g. | Mole Used | Molar Ratio | Solvent |
| --- | --- | --- | --- | --- |
| TFTBD | 3.0 | 0.0132 | 3 | 60 ml. toluene. |
| Dy(NO$_3$)$_3$·6H$_2$O | 2.0 | 0.0044 | 1 | 40 ml. water. |
| Quinoline | 1.8 | 0.0132 | 3 | |

The dysprosium nitrate is dissolved in water and the resulting solution placed in a separatory funnel. The butanedione (TFTBD) is dissolved in toluene and added to the funnel, after which the quinoline is added and the mixture vigorously agitated. The reaction mass separates into organic and aqueous phases when agitation is discontinued. The water layer is drawn off, and 200 ml. of petroleum ether, B.P. 35°–55° C., is added to the toluene layer. A product comprising crystals of dysprosium thenoyltrifluoroacetonate, $Dy(TTA)_3$, precipitates. This product is isolated by filtration, washed with petroleum ether and air-dried. The dried powder has an off-white color.

EXAMPLE 6

*Preparation of europium benzoylacetonate*

| Materials Used | Weight Used, g. | Mole Used | Molar Ratio | Solvent |
|---|---|---|---|---|
| $Eu(NO_3)_3 \cdot 6H_2O$ | 4.46 | 0.01 | 1 | 50 ml. water. |
| 1-phenyl-1,3-butane-dione. | 4.87 | 0.03 | 3 | 80 ml. toluene. |
| Quinoline | 3.88 | 0.03 | 3 | |

The europium nitrate is dissolved in water. To this is added the solution of 1-phenyl-1,3-butanedione. The resulting mixture is shaken vigorously. The quinoline is then added and the mixture is again shaken. The water layer, which separates on standing, is withdrawn. The organic layer does not show the expected red fluorescence under U.V. light. The separated aqueous solution is again mixed with the toluene solution and the mixture is boiled. There is still no evidence of fluorescence when the toluene solution is tested under U.V. light.

Hence, coming down the $pK_b$ scale, various bases including quinoline, N,N-dimethylbenzylamine and pyridine are added to samples of the toluene layer and the treated samples are tested for their fluorescence upon exposure to U.V. light. The sample fluoresces when pyridine is added. An excess of pyridine is then added to the main portion of the toluene solution.

The water layer is again separated. Pentane is added to the organic layer in an amount sufficient to precipitate a product comprising europium benzoylacetonate, $$[Eu(BAC)_3]$$

The amount of pentane added is such that the addition of any further amount of pentane does not make the resulting solution any more turbid. The solution is stirred until it is clear and a precipitate remains. The $Eu(BAC)_3$ is isolated by filtration and washed with additional pentane to obtain purified $(Eu(BAC)_3)$. The dried chelate is an off-white color and gives a red fluorescence under U.V. light.

EXAMPLE 7

*Preparation of europium acetylacetonate*

| Materials Used | Weight Used, g. | Mole Used | Molar Ratio | Solvent |
|---|---|---|---|---|
| $Eu(NO_3)_3 \cdot 6H_2O$ | 4.46 | 0.01 | 1 | 150 ml. water. |
| Acetylacetone | 3.10 | 0.03 | 3 | |
| Pyridine | 4.00 | Excess | >3 | |

The europium nitrate is dissolved in water, and the acetylacetone is added with vigorous stirring to the resulting solution. The pyridine is added dropwise to the vigorously stired mixture. A precipitate comprising europium acetylacetonate, $Eu(AAC)_3$, forms and is removed by filtration, washed with pentane and vacuum dried. The dried europium chelate is a light yellow powder that shows a faintly red fluorescence in U.V. light of 3600 A. wavelength.

EXAMPLE 8

*Preparation of yttrium acetylacetonate*

Same as in Example 7 with the exception that 0.01 mole of $Y(NO_3)_3 \cdot 6H_2O$ is employed instead of $$Eu(NO_3)_3 \cdot 6H_2O$$

and there is used only 100 ml. water to dissolve the yttrium nitrate in place of the 150 ml. water employed to dissolve the europium nitrate. The dried yttrium acetylacetonate, $Y(AAC)_3$, is a white powder that gives a bright green fluorescence under 3600 A. U.V. irradiation.

The following examples illustrate the incorporation of chelates of rare-earth metals, prepared as described in the foregoing examples, into an organopolysiloxane.

EXAMPLE 9

(A) *Preparation of an organopolysiloxane*

A 250-ml. three-necked flask is equipped with a thermometer, magnetic stirrer and condenser. The condenser is provided with a take-off to allow reflux or distillation. In the thusly-equipped flask is placed 94 ml. (0.5 mole) of methyltriethoxysilane, 60 ml. (0.25 mole) of phenyltriethoxysilane and 40.5 ml. (2.25 moles) of water. The resulting two-phase mixture is heated to about 80° C. After heating for about 5 minutes at this temperature a one-phase system is formed. This single-phase reaction mass is heated under reflux with stirring for 4 hours. At the end of this time about 80% of the theoretical amount of by-product ethanol has been recovered as a distillate. The residual liquid organopolysiloxane contains about 60% by weight of solids. The organopolysiloxane therein, which has an average molecular weight of about 86.5, may be represented in its completely condensed state by the formula $$[(CH_3)_{0.67}(C_6H_5)_{0.33}Si_{1.0}O_{1.5}]_n$$

The aforementioned residue of liquid organopolysiloxane resin is transferred to a 300-ml. beaker in which it is heated with stirring to 140° C. to effect precure. It is held only momentarily at 140° C. A clear, viscous, incompletely condensed resin results.

(B) *Incorporation of $Pr(TTA)_3$ in an organopolysiloxane resin*

To 74 grams of precured resin (about ½ mole prior to precure to 140° C.) dissolved in ethanol (50 ml.) and cooled to 75° C. is added 0.0005 mole (0.404 g.) of $Pr(TTA)_3$ of Example 4 dissolved in a small amount of ethanol. This is in a molar ratio of Si to Pr of approximately 1000:1.

The solutions are thoroughly mixed together to obtain a homogeneous liquid mass, after which a glass slide is dipped therein to provide a coating theron. The mixture is then precured again by heating to 120° C. After this second precure a second glass slide is coated by dipping in the hot, liquid resin, and castings are made by pouring samples into small circular aluminum pans wherein discs are formed when the resin is fully cured.

The pans containing the precured chelate-modified organopolysiloxane resin and the coated glass slides are placed in a 90° C. oven for 48 hours. At the end of this period of time the coatings on the slides are hard and clear, as are also the cured discs. Both the coatings and the discs exhibit a weak but deep red fluorescence when exposed to U.V. light.

EXAMPLE 10

Example 9 is repeated using 0.0005 mole of $La(TTA)_3$ of Example 3 instead of 0.0005 mole of $Pr(TTA)_3$ of Example 4. The cured discs and coated glass slides fluoresce with a weak, light blue fluorescence when exposed to U.V. light.

EXAMPLE 11

$Tb(TTA)_3$, 0.4 g., of Example 2 is added to 74 ml. (½ mole) of a liquid organopolysiloxane, prepared as described in Example 9–A, prior to the precuring step. The mixture is precured by heating with stirring to 140° C., after which several castings are made in circular aluminum molds. Precuring and final curing at 90° C. are carried out as described in Example 9–B. The discs are hard, transparent and show bright green fluorencence when exposed to U.V. light.

EXAMPLE 12

Example 11 is repeated exactly using 0.4 g. of Eu(TTA)$_3$ of Example 1 instead of 0.4 g. of Tb(TTA)$_3$. When exposed to U.V. light the discs are hard, transparent and show a bright orange-red fluorescence.

EXAMPLE 13

(A) *Preparation of neodymium thenoyltrifluoroacetonate[Nd(TTA)$_3$]*

| Materials Used | Weight Used, g. | Mole Used, g | Molar Ratio | Solvent |
|---|---|---|---|---|
| TFTBD | 3.35 | 0.015 | 3 | 60 ml. toluene. |
| Nd(NO$_3$)$_3$·6H$_2$O | 2.19 | 0.005 | 1 | 40 ml. water. |
| Quinoline | 1.94 | 0.015 | 3 | |

The same procedure is followed as described in Example 5 with the exception that 0.005 mole of $$Nd(NO_3)_3 \cdot 6H_2O$$

is employed instead of 0.0044 mole of Dy(NO$_3$)$_3$·6H$_2$O. The molar ratios between the materials used are the same. The product, Nd(TTA)$_3$, is a greyish-white purple color.

(B) *Incorporation of Nd(TTA)$_3$ in an organo polysiloxane resin*

Seventy-four (74) grams (½ mole) of a liquid organopolysiloxane resin, prepared as described in Example 9–A, is dissolved in 50 ml. ethanol. A small amount (0.4 g.) of Nd(TTA)$_3$ of the A portion of this example is dissolved in ethanol, and the resulting ethanol solution is mixed with the aforementioned ethanol solution of the organopolysiloxane resin. The chelate-modified resin in alcohol solution is precured by heating with stirring to 140° C. Two molded discs are produced by casting and molding the precured resin as described in Example 9–A.

EXAMPLE 14

(A) *Preparation of samarium thenoyltrifluoroacetonate*

| Materials Used | Weight Used, g. | Mole Used, g | Molar Ratio | Solvent |
|---|---|---|---|---|
| TFTBD | 6.6 | 0.03 | 3 | 50 ml. toluene. |
| Sm(NO$_3$)$_3$·6H$_2$O | 3.64 | 0.01 | 1 | 25 ml. toluene. |
| Quinoline | 3.9 | 0.03 | 3 | |

Essentially the same procedure is followed as described under Example 5 with the exception that 0.01 mole of Sm(NO$_3$)$_3$·6H$_2$O is used instead of 0.0044 mole of Dy(NO$_3$)$_3$·6H$_2$O. The molar ratios between the materials employed are the same. The product, Sa(TTA)$_3$, is an off-white color.

(B) *Incorporation of Sm(TTA)$_3$ in an organopolysiloxane resin*

Seventy-four (74) grams (½ mole) of a liquid organopolysiloxane resin, prepared as described in Example 9–A, is precured by heating with stirring to 140° C., and the precured resin is then dissolved in 50 ml. ethanol. The remainder of the procedure is the same as described in Example 13–B with the exceptions that 0.4 g. of Sm(TTA)$_3$ is used instead of 0.4 g. of Nd(TTA)$_3$, and the temperature to which the chelate-modified resin is heated is 120° C. instead of 140° C.

EXAMPLE 15

To 74 grams of precured resin (about ½ mole prior to precure to 140° C.) dissolved in ethanol (50 ml.) and cooled to 75° C. is added 0.0005 mole of Eu(TTA)$_3$, molecular weight 818.6, of Example 1, dissolved in a small amount of ethanol. This is a molar ratio of Si to Eu of approximately 1000:1.

The solutions are thoroughly mixed together to obtain a homogeneous liquid mass, after which a glass slide is dipped therein to provide a coating thereon. The mixture is then precured again by heating to 120° C. at which time a second glass slide is coated and two discs are cast and molded as described in Example 9–B.

At the end of the cure period all four samples (i.e., the two coated slides and the two discs) exhibit a high degree of orange-red fluorescence under U.V. light.

EXAMPLE 16

Same as in Example 15 with the exception that 0.0005 mole of Tb(TTA)$_3$ of Example 2 is used instead of 0.0005 mole of Eu(TTA)$_3$. The glass slides coated with the cured, chelate-modified, organopolysiloxane resin of this example, as well as the cured molded discs made from the same modified resin, are hard, transparent and quite fluorescent (green) at room temperature (20°–30° C.). In marked contrast, Tb(TTA)$_3$ itself is fluorescent only at very low temperatures of the order of −196° C. This would indicate that the matrix is providing an unobvious action and that solid solution of the chelate in the matrix occurs.

EXAMPLE 17

This example illustrates a variety of different ways by which a rare-earth metal chelate can be incorporated into an organopolysiloxane. The liquid organopolysiloxane employed is one that has been prepared as described in Example 9–A. The chelate is Eu(TTA)$_3$. The ingredients, amounts thereof and procedures are the same except with the changes specified.

(A) The liquid organopolysiloxane resin (74 g.; about ½ mole) is precured by heating with stirring to 140° C. After cooling to 56° C. it is dissolved in 50 ml. acetone. Eu(TTA)$_3$ (0.2 g.) dissolved in about 10 ml. of acetone is added to the acetone solution of the organopolysiloxane resin, and the resulting mixture is heated with stirring to 80° C. The mixture is cured by heating in a 90° C. oven for about 48 hours. The cured resin contains many bubbles. It is not very fluorescent when exposed to U.V. light of short wave length (2537 A.) but is very fluorescent (orange-red) under U.V. light of long wave length (3600 A.).

(B) The A portion of this example is repeated but using ethanol instead of acetone to dissolve the precured polysiloxane resin and the europium chelate. The same results are obtained.

(C) Eu(TTA)$_3$ (0.2 g.) dissolved in about 10 ml. of acetone is added to the organopolysiloxane resin during precuring at that point when the temperature has reached 120° C. The finally cured resin has many surface bubbles but shows a bright orange-red fluorescence when exposed to U.V. light.

It will be understood, of course, by those skilled in the art that the present invention is not limited only to the use of the specific ingredients, proportions thereof, and procedures including time, temperature and other conditions given in the foregoing examples by way of illustration. Thus instead of the specific rare-earth chelates and the specific organopolysiloxanes employed in the individual examples one may use any other rare-earth chelate or any other organopolysiloxane. Illustrative examples of other organopolysiloxanes that may be modified with a rare-earth chelate in accordance with the present invention are described in the prior patent art, e.g., U.S. Patents 2,258,218–222 (Rochow); 2,449,572 (Welsh); 2,759,904 (Talcott); 2,855,380 (Hedlund); and in hundreds of other patents that have issued since the aforementioned Rochow patents. As previously mentioned, the preferred organopolysiloxanes are those broadly described in the second paragraph of this specification and more specifically elsewhere herein.

I claim:

1. A luminescent composition comprising (a) an organopolysiloxane which is the siloxane condensation product of hydrolysis of trialkoxysilane consisting essentially of such silane material represented by the general formula

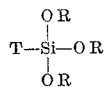

wherein each T independently represents a member of the group consisting of alkyl, alkenyl and aryl radicals having less than 7 carbon atoms, and R represents an alkyl radical having from 1 to 4 carbon atoms, inclusive, said organopolysiloxane having incorporated therein (b) a chelate of a rare-earth metal of the lanthanide series, or of yttrium, in an amount which is effective in imparting luminescence to the said composition under excitation and which is at least 1 part of the said chelate, calculated as the metal component thereof, per million parts of the said organopolysiloxane, said metal chelate being held in a matrix of the said organopolysiloxane when the latter has cured to solid state.

2. A luminescent composition as in claim 1 wherein the chelate is that of the defined metal with a ketone represented by the general formula

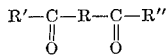

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R'' has the same meaning as R' and, in addition, a hydrogen atom.

3. A composition comprising a luminescent, machinable, heat-resistant body which comprises, by weight, a major amount of (I) the siloxane condensation product of a silanol consisting essentially of hydrocarbon-substituted silanetriol wherein the hydrocarbon substituent is an alkyl, alkenyl or aryl radical having less than 7 carbon atoms, said silanetriol including methylsilanetriol, and a minor amount of (II) a metal chelate of a ketone represented by the general formula

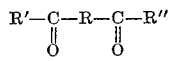

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R'' has the same meaning as R' and, in addition, a hydrogen atom, the metal component of the said chelate being a rare-earth metal of the lanthanide series, or of yttrium.

4. A composition as in claim 3 wherein the hydrocarbon-substituted silanetriol of (A) includes both methylsilanetriol and phenylsilanetriol in a molar ratio of 1:10 to 10:1.

5. A composition as in claim 3 wherein the chelate of (II) is a thenoyltrifluoroacetonate of a rare-earth metal of the lanthanide series.

6. A composition as in claim 5 wherein the rare-earth thenoyltrifluoroacetonate is europium thenoyltrifluoroacetonate.

7. A composition as in claim 5 wherein the rare-earth thenoyltrifluoroacetonate is terbium thenoyltrifluoroacetonate.

8. A composition as in claim 5 wherein the rare-earth thenoyltrifluoroacetonate is lanthanum thenoyltrifluoroacetonate.

9. A composition as in claim 5 wherein the rare-earth thenoyltrifluoroacetonate is praseodymium thenoyltrifluoroacetonate.

10. A composition as in claim 3 wherein the chelate of (II) is a benzoylacetonate of a rare-earth metal of the lanthanide series, or of yttrium.

11. A composition as in claim 10 wherein the benzoylacetonate is europium benzoylacetonate.

12. A composition as in claim 3 wherein the chelate of (II) is an acetylacetonate of a rare-earth metal of the lanthanide series, or of yttrium.

13. A composition as in claim 12 wherein the acetylacetonate is europium acetylacetonate.

14. The method of producing a solid, luminescent, organopolysiloxane composition which comprises:

(A) forming a liquid siloxane partial condensation product by heating, at a temperature of from about 50° C. to and including the reflux temperature of the reaction mass that is formed, a mixture of water and trialkoxysilane consisting essentially of such silane material represented by the general formula

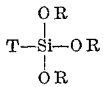

wherein each T independently represents a member of the group consisting of alkyl, alkenyl and aryl radicals having less than 7 carbon atoms, and R represents an alkyl radical having from 1 to 4 carbon atoms, inclusive, the amount of water in the said mixture corresponding to from 1.5 to 10 moles for each mole of total hydrolyzable silane, and the said heating being continued for at least one hour and up to about 10 hours while retaining a minimum of at least about 1.5 moles of hydroxy-containing by-products in the reaction mass per mole of silicon-containing starting material, said minimum of about 1.5 moles being calculated on the basis that complete hydrolysis of all the hydroxyhydrocarbyl silicon linkages in the reaction mass has been effected;

(B) adding a metal chelate dissolved in a volatile organic solvent to and mixing it with the liquid siloxane partial condensation product prepared as described in step A, either before, during or after heating said liquid condensation product to precure it, said metal chelate being a chelate of a rare-earth metal of the lanthanide series, or of yttrium, and being added to the liquid siloxane condensation product in an amount which is effective in imparting, under excitation, luminescence to the ultimate organopolysiloxane composition, and which is at least 1 part of the said chelate, calculated as the metal component thereof, per million parts of organopolysiloxane in the ultimate organopolysiloxane composition; and (C) curing the metal chelate-modified, liquid siloxane partial condensation product at a temperature of at least 20° C. for a period of time sufficient to form a hard, solid organopolysiloxane composition which luminesces under excitation.

15. The method as in claim 14 wherein the metal chelate is a chelate of a rare-earth metal of the lanthanide series, or of yttrium, with a ketone represented by the general formula

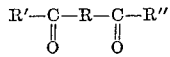

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R" has the same meaning as R' and, in addition, a hydrogen atom.

16. The method as in claim 14 wherein the trialkoxysilane consists essentially of both methyltrialkoxysilane and phenyltrialkoxysilane in a molar ratio of 1:10 to 10:1, the alkyl radicals in the alkoxy groups of each of the said trialkoxysilanes having from 1 to 4 carbon atoms, inclusive.

References Cited

UNITED STATES PATENTS

| | | | |
|---|---|---|---|
| 3,127,363 | 3/1964 | Nitzsche et al. | 260—46.5 |
| 3,142,655 | 7/1964 | Bobear | 260—46.5 |
| 3,208,972 | 9/1965 | Lyons | 260—46.5 |
| 3,225,307 | 12/1965 | Weissman | 252—301.2 |
| 3,237,330 | 6/1966 | Burzynski et al. | 252—301.2 |

FOREIGN PATENTS 759,013    10/1956    Great Britain.

DONALD E. CZAJA, *Primary Examiner.*

LEON J. BERCOVITZ, *Examiner*

M. I. MARQUIS, *Assistant Examiner.*